Figure 1:
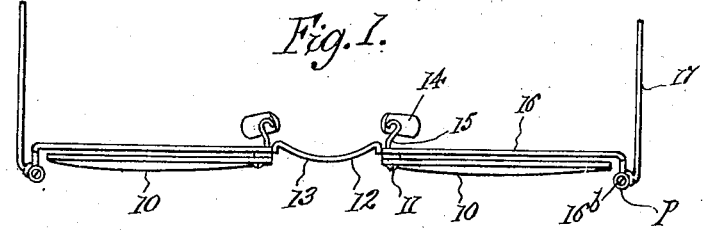

Jan. 11, 1949.  T. F. HEALY  2,458,594
SAFETY MOUNTING FOR LENSES
Filed Oct. 7, 1944

Inventor
Thomas F. Healy Attorney

UNITED STATES PATENT OFFICE 2,458,594

SAFETY MOUNTING FOR LENSES

Thomas F. Healy, Washington, D. C., assignor to Saf-Mont, Inc., Washington, D. C., a corporation of Delaware Application October 7, 1944, Serial No. 557,637

1 Claim. (Cl. 88—41)

The present invention relates to a safety mounting for lenses, and more particularly to a safety mounting for drilled ophthalmic lenses of the type ordinarily employed in rimless spectacles.

The primary object of this invention is to provide a safety mounting which, in combination with two aligned drilled lenses, results in a protective structure for the lenses.

Another important object is to provide a spectacle mounting in which the temple pieces can fold forwardly and horizontally across the convex faces of the lenses comprising the spectacles to provide a structure to prevent scratching of the lenses when the spectacles are not being used. The temple pieces, in fully folded form preferably do not contact the convex faces of the lenses, to thus provide a cushioning effect when the spectacles are disposed in a lens container with convex faces downwardly.

Another object is to provide a pivot connection joining the temple and temple-supporting member in such a manner that the temple is free to swing forwardly.

Still another object is to provide a pivot connection in a mounting assembly for spectacle lenses in such a combined relationship that the said pivot will preferably first engage any flat surface upon which the mounted lenses are horizontally disposed with convex surfaces downward.

Another object is to provide a safety mounting assembly for spectacle lenses of such structure that the lenses are more completely protected against breakage when the spectacles are disposed in the ordinary spectacle container now employed in the art.

The broad concept of this invention embraces the feature of providing a lens mounting having the point of connection between the temple piece and the temple support forwardly of the concave face of the lens of the mounting and preferably at a point slightly further forward than the foremost portion of the convex face of said lens.

The mounting of the invention broadly comprises a pair of temple supports, a pair of temple members, pivot means associated with each of said temple supports, and said pivot means each being disposed forwardly of its corresponding temple support. By the term temple support I mean to include all conventional means for supporting a temple. For example, I intend to include frames for rimmed as well as rimless spectacles. By pivot means I intend to include any means which will permit a temple member to fold across the convex face of a lens, and preferably to fold horizontally.

I am fully aware of such patents as U. S. Patent No. 421,779.

Further objects and advantages of the invention will be apparent from the following description thereof and from the claim appended thereto.

Figure 2:
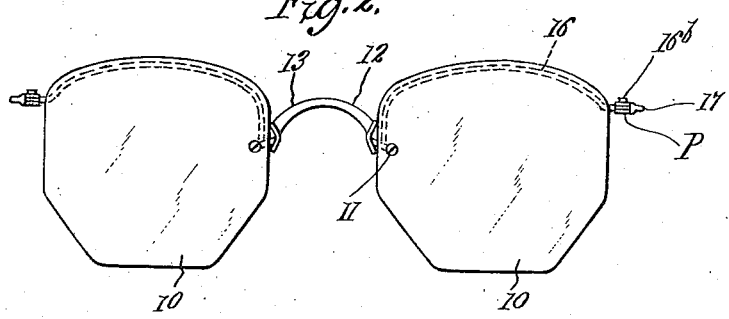
Figure 3:
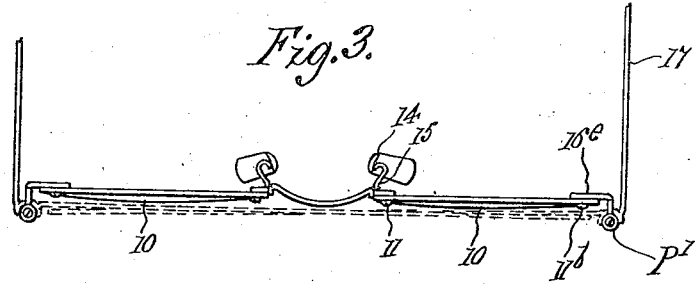
Figure 4:
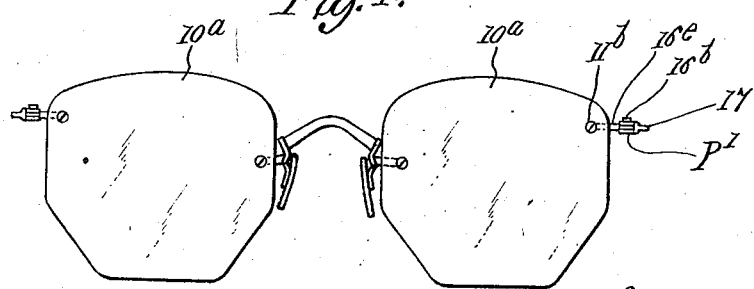
Figure 5:
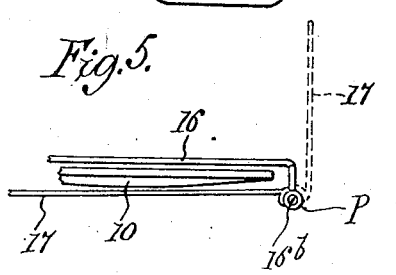
Figure 6:
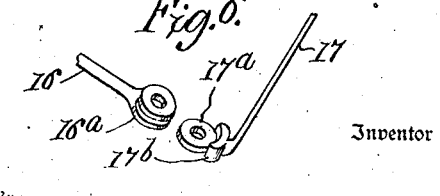

In the drawing, in which three forms of my invention are shown, and wherein like numerals refer to like or corresponding parts throughout the several views:

Figure 1 is a top plan of the safety mounting for spectacles and embodies the invention, Figure 2 is a front elevation of the mounting, shown in Figure 1, Figure 3 is a top plan view of a modified form of the invention, Figure 4 is a front elevation of the mounting shown in Figure 3, Figure 5 is a fragmentary detail of the mounting of Figures 1 and 2 illustrating the movement of the temple, and Figure 6 is an enlarged fragmentary detail showing the pivot connection between the temple and temple support.

Referring now to the drawing, and more particularly to Figures 1 and 2, the numeral 10 indicates an ophthalmic lens preferably drilled at only one point, as 11. Inasmuch as the structure of mounting is identical relative to both lenses, the description thereof will be limited to only one lens.

The numeral 12 generally indicates a lens supporting means for holding the lenses in spaced alignment and in secured together relationship. The central lens supporting means 12 consists of a central bridge portion 13 adapted to fit over the nose of the person wearing the spectacles, guard means 14 adapted to fit on the sides of the nose and strap means 15, anchored to the lens 10 at the hole 11 in any suitable conventional manner. The lens supporting means 12 does not per se constitute a part of this invention. Any suitable means known in the art for securing together spectacle lenses can be employed in the practice of the invention.

A temple-supporting wire 16 is secured to the lens supporting means 12 in any suitable manner as by soldering. Said wire 16 preferably follows the contour of the upper edge portion of the lens 10 and extends beyond the edge of said lens 10 at a point remote from the lens supporting means 12.

The wire 16 is preferably bent around the outer peripheral edge of the lens 10 and forwardly to terminate in a pivot portion P. The pivot portion P preferably extends forwardly relative to the convex face of the lens 10, so that when the spectacles are disposed horizontally upon a flat surface, the pivot portion P first engages the surface thereof.

The pivot portion P may comprise any pivot means which will permit the movement of the temple 17 forwardly and across the convex face of the lens 10. In Figure 6, I have shown the temple member 17 as terminating at one end thereof with disc 17a, and stop means or detent 17b. In Figure 6 I have shown the temple-supporting member 16 terminating in a bifurcated portion 16a. The portion 17a slidably engages in portion 16a and is secured therein by means of any stop screw 16b.

With reference to figure 5, it is to be noted that the temple member 17 can swing horizontally and forwardly across the convex face of the lens 10. The detent means 17b limits the circular movement of the temple 17 by engaging with a portion of arm 16.

Referring to Figures 3 and 4, I have shown a modified form of my invention wherein the pivot means P' is secured to a portion 16e, which suitably engages means 10a at the drilled portion 11b.

The pivot means P' extends forwardly of the lens 10a, and preferably first engages a flat surface when the spectacles are disposed horizontally thereon. The pivot means P' may extend forwardly at any desired angle from portion 16e.

The remaining structure of the mounting shown in Figures 3 and 4 is conventional, and does not constitute a part of my invention. For purpose of illustration, I have shown these parts similarly to the parts shown in Figures 1 and 2.

Although the temple-supporting wires 16 are illustrated as being of substantially circular cross sectional shape, it is to be understood that the said wires may be formed triangularly, squarely, rectangularly, or in any other desired cross sectional shape. If desired, other flexible materials, such as plastics, may be employed for the temple-supporting members.

It is to be understood that many shapes of lenses may be employed. The mounting may be integral, or of separate parts joined together to provide a unitary structure.

Broadly, this invention relates to the feature of disposing the pivotal connection between a temple and the temple support, forwardly of the temple support, so that said pivot will preferably first engage a flat surface when the mounting is disposed horizontally thereon, and also to permit the said temple to fold forwardly rather than rearwardly as is now the conventional practice.

Various modifications of this invention will be apparent to those skilled in the art, without departing from the spirit of this invention, and it is intended to be limited only by the scope of the appended claim.

What I claim as my invention:

Safety spectacles comprising, in combination, a pair of temples, a pair of lenses each having a concave and a convex side, means to secure said lenses together, a pair of flexible temple-supporting members each associated with one of said lenses and being adapted to flex independently relatively thereto, each of said temple-supporting members extending from the concave side of its corresponding lens to terminate in a pivot on the convex side thereof, said pivot being disposed beyond the foremost point on the convex side of its corresponding lens so that said pivot first engages a flat surface when the spectacles are horizontally positioned thereon with convex faces downwardly, each of said temples being attached to its corresponding temple-supporting member by means of said pivot which is designed to permit said temple to fold forwardly across the face of its corresponding lens.

THOMAS F. HEALY.

REFERENCES CITED

The following references are of record in the file of this patent:

UNITED STATES PATENTS

| Number | Name | Date |
|---|---|---|
| 421,779 | Stevens | Feb. 18, 1890 |
| 584,765 | Alexander | June 22, 1897 |
| 1,177,189 | King | Mar. 28, 1916 |
| 1,401,572 | Sillson et al. | Dec. 27, 1921 |
| 1,404,039 | McKinstry | Jan. 17, 1922 |
| 1,992,260 | Thomson | Feb. 26, 1935 |
| 2,223,646 | Splaine | Dec. 3, 1940 |
| 2,238,919 | Splaine | Apr. 22, 1941 |